US008595762B2

(12) United States Patent
Ramanathan

(10) Patent No.: US 8,595,762 B2
(45) **Date of Patent: *Nov. 26, 2013**

(54) CONFIRMING VIDEO TRANSMISSIONS

(75) Inventor: Ramanathan Ramanathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/234,464

(22) Filed: Sep. 16, 2011

(65) Prior Publication Data

US 2012/0011532 A1 Jan. 12, 2012

Related U.S. Application Data

(63) Continuation of application No. 12/721,699, filed on Mar. 11, 2010, now Pat. No. 8,032,904, which is a continuation of application No. 09/138,807, filed on Aug. 21, 1998, now Pat. No. 7,707,600.

(51) Int. Cl.
*H04N 7/10* (2006.01)
*H04N 7/025* (2006.01)

(52) U.S. Cl.
USPC ............... 725/34; 725/22; 725/112; 725/136; 348/432.1; 348/343.1; 348/476; 348/477; 455/3.01; 455/3.03; 455/3.05; 709/231; 709/236; 714/704; 714/774; 714/748

(58) Field of Classification Search
USPC ............. 725/22, 32, 34, 112, 136; 348/432.1, 348/434.1, 476, 477; 455/3.01, 3.03, 3.05; 709/231, 236; 714/704, 774, 748
See application file for complete search history.

(56) References Cited

U.S. PATENT DOCUMENTS

| | | | |
|---|---|---|---|
| 4,230,990 | A | 10/1980 | Lert |
| 4,241,398 | A | 12/1980 | Carll |
| 4,736,369 | A | 4/1988 | Barzilai |
| 4,805,020 | A | 2/1989 | Greenberg |
| 4,805,167 | A | 2/1989 | Leslie |
| 4,912,552 | A | 3/1990 | Allison, III |
| 5,090,011 | A | 2/1992 | Fukuta |
| 5,111,292 | A | 5/1992 | Kuriacose et al. |
| 5,200,822 | A | 4/1993 | Bronfin |
| 5,253,275 | A | 10/1993 | Yurt |
| 5,349,678 | A | 9/1994 | Morris |
| 5,355,161 | A | 10/1994 | Bird |

(Continued)

OTHER PUBLICATIONS

Comer, Douglas E., Computer Networks and Internets, 1999, Prentice-Hall, Second Edition, pp. 11-13.

(Continued)

*Primary Examiner* — Jason Salce
(74) *Attorney, Agent, or Firm* — Trop, Pruner & Hu, P.C.

(57) ABSTRACT

In an interactive broadcasting system, television programming may be broadcast with interleaved web content information. The progress in broadcasting the web content information over one or more transports and over one or more channels within those transports, may be monitored to provide a time based indication of what content has been broadcast. In one embodiment, markers may be inserted into the data transmission flow and a method may be utilized to associate a handle with a particular marker. A method may be called which obtains the handle and another method may be utilized to invoke the handle to obtain current information about broadcast transmissions. This information may be used within a broadcast encoder or may be provided to a content provider, for example, through a log-in server.

25 Claims, 4 Drawing Sheets

(56) References Cited

U.S. PATENT DOCUMENTS

| | | | |
|---|---|---|---|
| 5,374,951 | A | 12/1994 | Welsh |
| 5,390,188 | A | 2/1995 | Dawson |
| 5,426,640 | A | 6/1995 | Hluchyj |
| 5,434,847 | A | 7/1995 | Kou |
| 5,440,334 | A | 8/1995 | Walters |
| 5,446,489 | A | 8/1995 | Egendorf |
| 5,450,122 | A | 9/1995 | Keene |
| 5,526,427 | A | 6/1996 | Thomas |
| 5,568,645 | A | 10/1996 | Morris |
| 5,584,050 | A | 12/1996 | Lyons |
| 5,613,195 | A | 3/1997 | Ooi |
| 5,627,970 | A | 5/1997 | Keshav |
| 5,646,675 | A | 7/1997 | Copriviza |
| 5,680,322 | A | 10/1997 | Shinoda |
| 5,737,025 | A | 4/1998 | Dougherty |
| 5,745,504 | A | 4/1998 | Bang |
| 5,751,969 | A | 5/1998 | Kapoor |
| 5,764,626 | A | 6/1998 | Vandervort |
| 5,784,597 | A | 7/1998 | Chiu |
| 5,793,976 | A | 8/1998 | Chen |
| 5,805,203 | A | 9/1998 | Horton |
| 5,826,165 | A | 10/1998 | Echeita |
| 5,835,771 | A | 11/1998 | Veldhuizen |
| 5,854,897 | A | 12/1998 | Radziewicz |
| 5,889,957 | A | 3/1999 | Ratner |
| 5,894,479 | A | 4/1999 | Mohammed |
| 5,894,589 | A | 4/1999 | Reber |
| 5,913,039 | A | 6/1999 | Nakamura |
| 5,918,020 | A | 6/1999 | Blackard |
| 5,930,252 | A | 7/1999 | Aaker |
| 5,949,410 | A | 9/1999 | Fung |
| 5,956,716 | A | 9/1999 | Kenner |
| 6,014,693 | A | 1/2000 | Ito |
| 6,018,768 | A | 1/2000 | Ullman |
| 6,031,818 | A | 2/2000 | Lo |
| 6,031,833 | A | 2/2000 | Fickes |
| 6,061,719 | A | 5/2000 | Bendinelli |
| 6,064,438 | A | 5/2000 | Miller |
| 6,081,907 | A | 6/2000 | Witty |
| 6,084,631 | A | 7/2000 | Tonkin |
| 6,091,709 | A | 7/2000 | Harrison |
| 6,091,777 | A | 7/2000 | Guetz |
| 6,097,441 | A | 8/2000 | Allport |
| 6,128,649 | A | 10/2000 | Smith |
| 6,141,032 | A | 10/2000 | Priest |
| 6,144,375 | A | 11/2000 | Jain |
| 6,144,636 | A | 11/2000 | Aimoto |
| 6,173,271 | B1 | 1/2001 | Goodman |
| 6,182,139 | B1 | 1/2001 | Brendel |
| 6,192,410 | B1 | 2/2001 | Miller |
| 6,198,783 | B1 | 3/2001 | Campana, Jr. |
| 6,215,774 | B1 | 4/2001 | Knauerhase |
| 6,275,471 | B1 | 8/2001 | Bushmitch |
| 6,279,157 | B1 | 8/2001 | Takasu |
| 6,295,092 | B1 | 9/2001 | Hullinger |
| 6,297,845 | B1 | 10/2001 | Tran |
| 6,304,567 | B1 | 10/2001 | Rosenberg |
| 6,308,328 | B1 | 10/2001 | Bowcutt |
| 6,310,892 | B1 | 10/2001 | Olkin |
| 6,317,441 | B1 | 11/2001 | Nakajima |
| 6,330,033 | B1 | 12/2001 | Cooper |
| 6,351,281 | B1 | 2/2002 | Cooper |
| 6,353,929 | B1 | 3/2002 | Houston |
| 6,356,309 | B1 | 3/2002 | Masaki |
| 6,356,555 | B1 | 3/2002 | Rakib |
| 6,400,407 | B1 | 6/2002 | Zigmond et al. |
| 6,401,121 | B1 | 6/2002 | Yoshida |
| 6,415,438 | B1 | 7/2002 | Blackketter |
| 6,445,717 | B1 | 9/2002 | Gibson |
| 6,459,427 | B1 | 10/2002 | Mao |
| 6,519,226 | B1 | 2/2003 | Kumar |
| 6,526,049 | B1 | 2/2003 | Murata |
| 6,983,478 | B1 | 1/2006 | Grauch |
| 7,707,600 | B1 | 4/2010 | Ramanathan |
| 8,032,904 | B2 | 10/2011 | Ramanathan |

OTHER PUBLICATIONS

RPI Library API Specification, http://www-out.bell-labs.com/project/RTPlib/DOCS/rtp_api.html, Jun. 1998.

Chaboya, D., AFCERT, Intrusion Detection Utilizing Ethereal, 1997, U.S. Air Force, all pages.

Microsoft Windows for Workgroups & MS-DOS, Microsoft Corporation, 1994, Chapter 2, pp. 16-17 and 77-81.

JMF Solutions: Transmitting Audio and Video Using RTP, 1995, pp. 1-2.

Kessler, G., et al., A Primer on Internet and TCP/IP Tools, Dec. 1994, all pgs.

Postel, J. Internet Protocol, DARPA Internet Program Protocol Specification, Information Sciences Institute, Sep. 1981, all pgs.

Postel, J., Network Working Group, RFC: 792, Internet Control Message Protocol, DARPA Internet Program Protocol Specification, Information Sciences Institute, Sep. 1981, all pgs.

Schulzrinne, H., et al.: RFC 1889, “RTP: A Transport Protocol for Real-Time Applications”, Audio-Video Transport Working Group, Jan. 1996, all pgs.

CONFIRMING VIDEO TRANSMISSIONS

CROSS-REFERENCE TO RELATED APPLICATIONS

This application is a continuation of U.S. patent application Ser. No. 12/721,699, filed on Mar. 11, 2010, now U.S. Pat. No. 8,032,904 which is continuation of U.S. patent application Ser. No. 09/138,807, filed on Aug. 21, 1998, which issued as U.S. Pat. No. 7,707,600.

BACKGROUND

This invention relates generally to video transmissions such as interactive broadcasting which involves, for example, broadcasting television programming together with web content.

A broadcast encoder interleaves, or multiplexes, television programming and web content and transmits it over a transport. A given transport could have a variety of different bandwidths. For example, one transport may be an airwave broadcasting system where the web content is provided over the vertical blanking interval (VBI). Other transports of potentially greater bandwidths include cable and satellite transmissions.

A content provider may provide television programming or the web content information to a broadcast encoder which then transmits the broadcast to a plurality of users over one or more transports. The users may receive the broadcast using a computer adapted television receiver. Thus, the user station may involve a set-top computer which operates a television receiver or a conventional computer equipped with a television capture card.

Because of bandwidth limitations and the availability of multiple transport mechanisms, it may be difficult for the broadcast encoder to report when a particular broadcast has actually occurred. For example, a particular piece of web content information may be routed over available bandwidths. During busy periods, these bandwidths may be tied up for considerable amounts of time or the available transmission bandwidths may be relatively limited. Therefore, it may not be determinable in advance, in all cases, exactly when a particular transmission will occur, how long it may take to complete the transmission, and when the transmission will be completed.

This lack of transmission certainty may be a problem for the content provider who may need to know when a transmission has been completed and how long a particular broadcast encoder takes to transmit the content provider's web content. This may be important in a variety of settings including determining whether a particular broadcaster has complied with its contractual obligations to broadcast a particular item and in ensuring that users have received information which may be critical to subsequent transmissions or subsequent activities. The content provider may not be able to proceed with other transmissions or activities until it knows that an initial transmission has been received.

Thus, there is a need, in connection with interactive broadcasting, for providing confirmation services.

SUMMARY

In accordance with one embodiment, a method for tracking video transmissions includes setting a first marker in the transmission data. Transmission after the first marker is tracked and reported.

DETAILED DESCRIPTION

Figure 1:
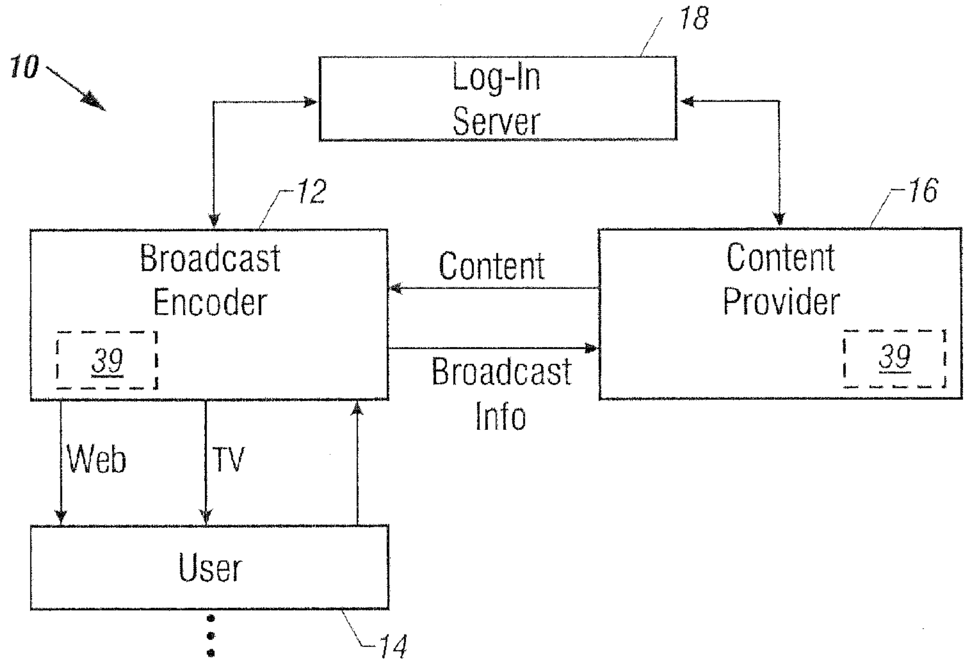
FIG. 1 is a conceptual depiction of an interactive broadcasting system in accordance with one embodiment of the present invention.

An interactive broadcasting system 10, shown in FIG. 1, allows a broadcast encoder to multiplex web content and television programming, and to broadcast the multiplexed information to a group of users 14. The broadcast encoder 12 may receive the content from a content provider 16. Periodically, the broadcast encoder may report on broadcast progress to the content provider. In addition, the broadcast encoder may provide a log-in server 18 which allows the content provider to check on the progress of commissioned broadcasts. Software may be provided in a memory 39 on either or both of the broadcast encoder 12 and the content provider 16 to provide broadcast tracking services.

While the illustrative embodiments relate to broadcasts, the present invention is applicable to other video transmissions such as multicasting. In addition, while a broadcast of television content is illustrated, non-television content may be encompassed as well.

Figure 2:
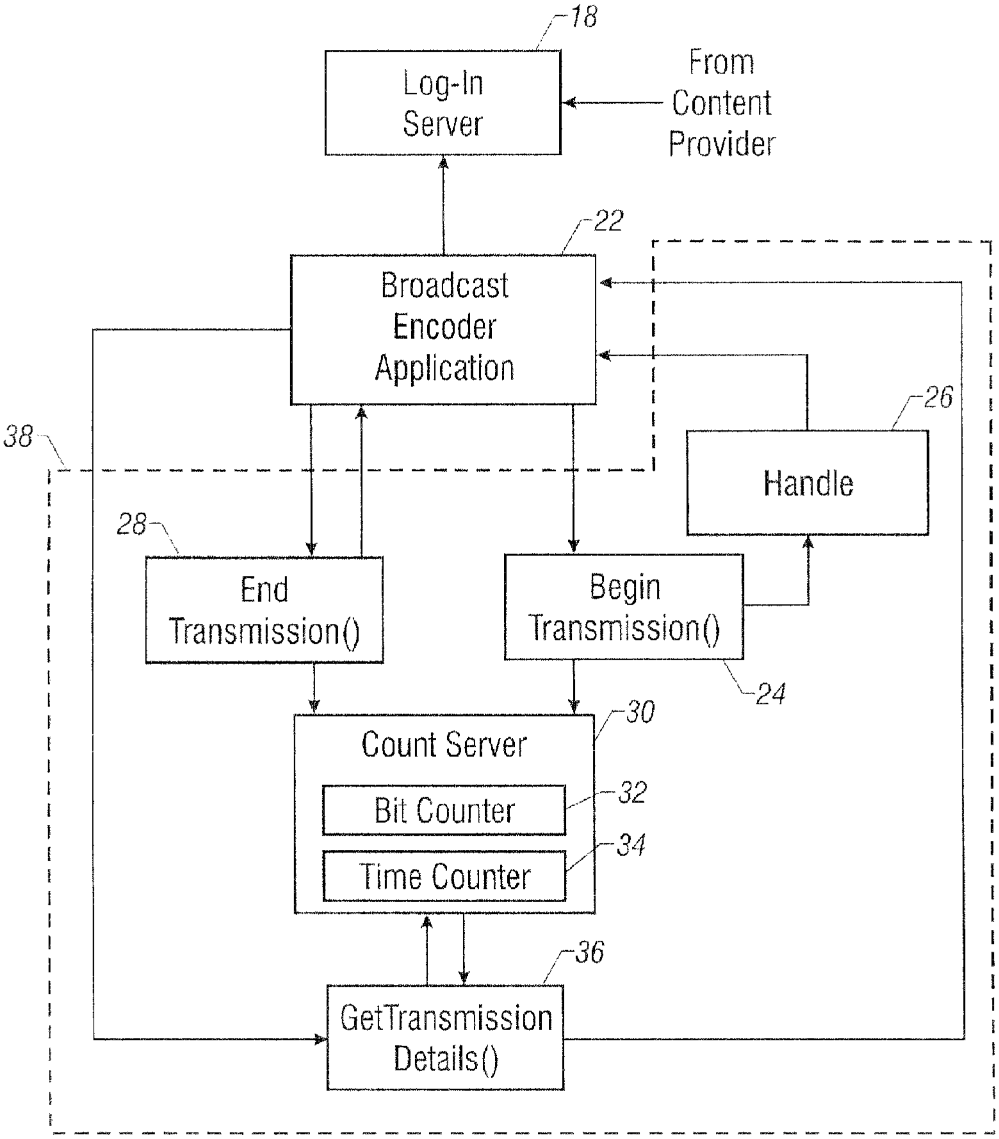
FIG. 2 illustrates a tracking system useful in the embodiment shown in FIG. 1.

Referring to FIG. 2, software 38 may interact with a broadcast encoder application 22. The broadcast encoder application software may report tracking information received from the tracking software 38 to the log-in server 18 so that the tracking information may be made accessible to the content provider.

When the broadcast encoder application 22 wishes to obtain tracking services, it initiates the BeginTransmission( ) method 24. The broadcast encoder application 22 may obtain tracking services either upon request from the content provider or upon its own initiative.

The BeginTransmission( ) method 24 (as well as other methods mentioned herein) may be a method available in an object-oriented programming language such as COM, ActiveX, or Java. In addition, function calls or Application Program Interfaces (APIs) may be utilized with non-object oriented programming languages to implement such tasks.

When the BeginTransmission( ) method 24 is called, the method obtains a handle 26 and returns the handle to the broadcast encoder application 22. The handle provides a pointer to a marker within the broadcast data stream.

When the broadcast encoder application 22 wishes to obtain information about broadcast details, it may call the GetTransmissionDetails( ) method 36. The method 36 returns a variety of transmission details to the broadcast encoder application 22. It can provide information about how much information has been sent, how much information has been received, whether information was lost, whether data has been cached, and other pertinent details.

The method 36 calls a count server 30 which includes a bit counter 32 and a time counter 34. The count server 30 counts transmitted bits and elapsed time. Thus, the GetTransmissionDetails( ) method 36 provides an indication of current transmission details as obtained from the count server 30. The GetTransmissionDetails( ) method 36 may be called at any time to give tracking information current as of that particular time.

The broadcast encoder application 22 uses the handle 26 it received previously to obtain the appropriate transmission details. In any given data transmission, there may be a number of markers which may be placed in the data flow either by the broadcast encoder 12 or the content provider 16. By identifying a particular handle, associated with a particular marker, the broadcast encoder application 22 receives the particular tracking information, associated with a particular marker, which is desired.

The broadcast encoder application can also call the EndTransmission( ) method 28. The method 28 communicates with count server 30 and completes a given tracking service associated with a particular marker. Thus, when the EndTransmission( ) method is called, the transmission details are provided up to that instance of time when the method 28 was called, and the marker is deactivated by terminating its associated handle.

In some instances, a particular marker may be passed to a plurality of data transmission streams which may be broadcast over different channels. In some cases, it may be desirable to know how much information has been transmitted by a group of broadcast streams, for example, associated with a particular content provider. By using the same marker in each of the streams, the GetTransmissionDetails( ) method 36 may be invoked to provide cumulative information about the data flow over the group of streams, referred to as a session.

Since the marker is not associated with the data flow directly, the use of the marker can be extended to measure any event occurring in the system at any level of granularity. Random events that may happen in the system may be monitored using markers which exist within the system as independent entities. As a marker is enabled, it becomes a measurement of an event which may be used to confirm, measure and log necessary information related to that event.

Markers can be provided at any level or granularity of the data transmission. For example, a data transmission may include a number of files, and markers may be associated with each of those files as well as with the overall broadcast that may include a plurality of files. Thus, information may be provided about the transmission of any one of the files and with respect to the overall transmission of files in the broadcast as well as any sub-group of files.

Figure 3A:
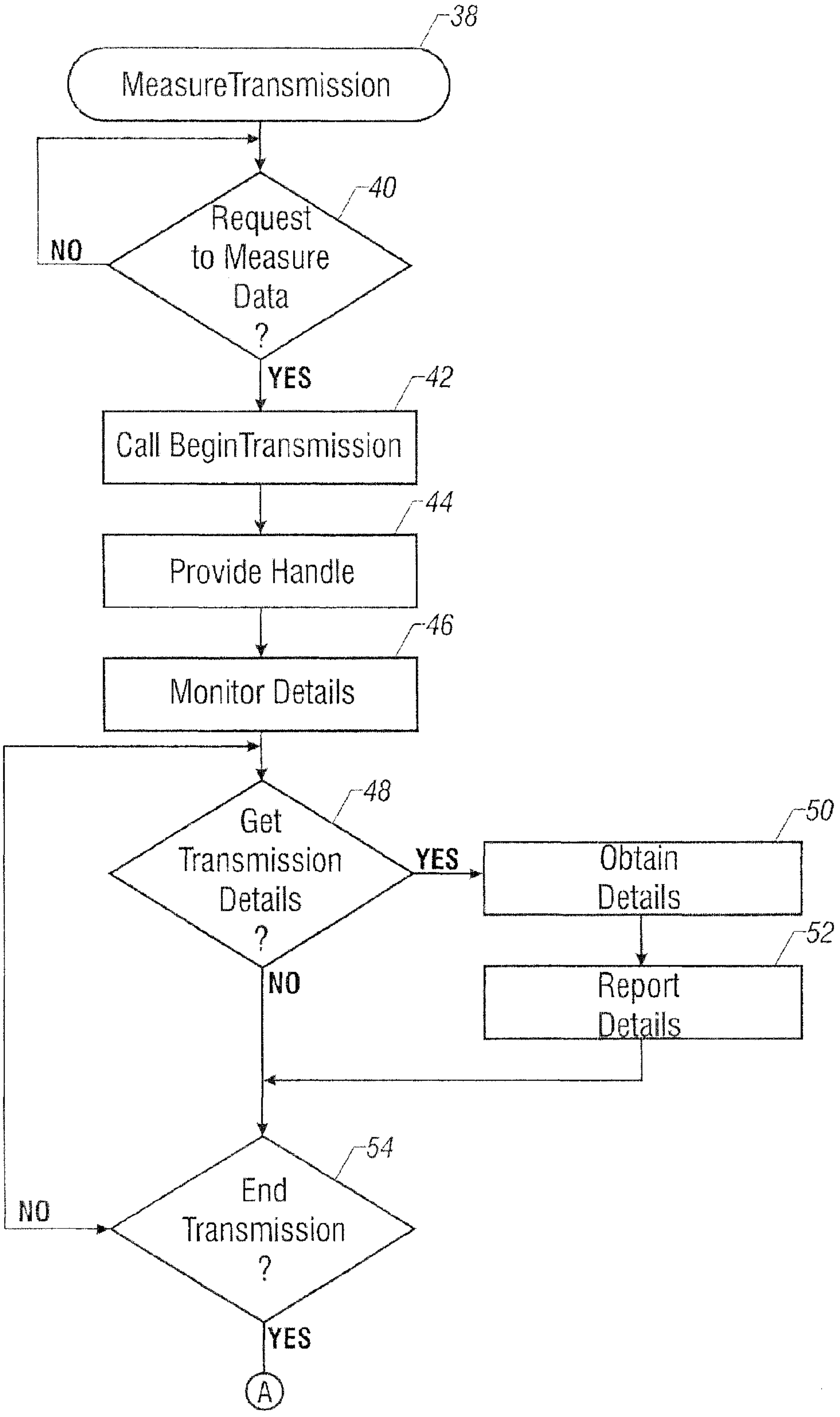
FIG. 3*a* is a flow diagram showing the operational software used on the broadcast encoder or the content provider shown in FIG. 1.

Initially, the MeasureTransmission software 38 awaits a request to measure data which may come from the broadcast encoder application, as indicated in diamond 40 in FIG. 3A. Upon receipt of such a request, the system calls the BeginTransmission( ) method which provides a handle or pointer for the application to access a particular marker, as indicated in blocks 42 and 44. Once a marker has been inserted and a handle has been provided, the transmission details may be cumulated (block 46) by the count server 30, shown in FIG. 2. When the GetTransmissionDetails( ) method is invoked, as indicated in diamond 48, the current details are obtained and a report may be provided to a log-in server 18, as indicated in blocks 50 and 52.

Figure 3B:
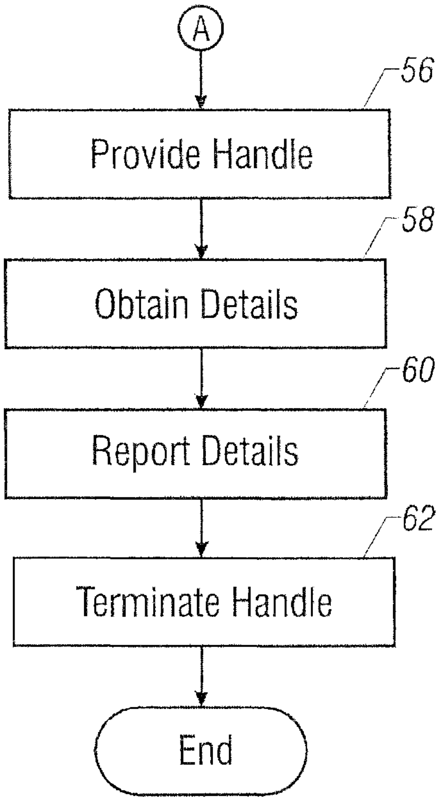
FIG. 3*b* is a continuation of FIG. 3*a*.

When the EndTransmission( ) method is called, as indicated in diamond 54, the appropriate handle is used as indicated in block 56 (FIG. 3B). As a result, the transmission details may be obtained and reported as indicated in blocks 58 and 60. Thereafter, the handle is terminated, as indicated in block 62.

While the present invention has been described with respect to a limited number of embodiments, those skilled in the art will appreciate numerous modifications and variations. It is intended that the appended claims cover all such modifications and variations as fall within the true spirit and scope of the present invention.

What is claimed is:

1. A non-transitory computer readable medium storing instructions executed by a computer to perform the steps of:
- receiving a request for tracking in connection with an interactive television transmission;
- inserting a first marker in said transmission;
- providing an on-going count of bits transmitted and time elapsed from the point in time when the first marker is transmitted;
- accumulating transmission information beginning at the point marked by said first marker; and
- upon request, reporting accumulated transmission information.

2. The medium of claim 1 storing instructions executed to perform the steps including receiving web content transmissions and accompanying television broadcasts from a content provider.

3. The medium of claim 2 storing instructions executed to perform the steps including receiving a web content broadcast with the first marker inserted within the broadcast, combining the web content broadcast with a television broadcast and transmitting the combined broadcast.

4. The medium of claim 2 storing instructions executed to perform the steps including receiving broadcast content from a content provider, combining the broadcast content with television programming at a broadcast encoder and inserting a marker at the broadcast encoder.

5. The medium of claim 1 storing instructions executed to perform the steps including invoking a method which provides a handle to said marker.

6. The medium of claim 5 storing instructions executed to perform the steps including invoking a method which obtains current transmission details using said handle.

7. The medium of claim 6 storing instructions executed to perform the steps including providing a second marker and associating said second marker with a second handle.

8. The medium of claim 7 storing instructions executed to perform the steps including calling a method which provides transmission details and terminates the handle.

9. The medium of claim 7 storing instructions executed to perform the steps including allowing said first and second markers to be accessed separately using separate handles so that transmission details associated with different portions of a transmission can be obtained.

10. The medium of claim 1 storing instructions executed to perform the steps including providing a log-in server, reporting a transmission to said log-in server and allowing a third party to access said log-in server to receive transmission reporting.

11. A non-transitory computer readable medium storing instructions executed by a computer to perform the steps of:
- receiving a request for tracking in connection with an interactive television transmission;
- inserting a first marker in said transmission;
- accumulating transmission information beginning at the point marked by said first marker;
- invoking a method which provides a handle to said first marker; and
- upon request, reporting accumulated transmission information.

12. The medium of claim 11 storing instructions executed to perform the steps including receiving web content transmissions and accompanying television broadcasts from a content provider.

13. The medium of claim 12 storing instructions executed to perform the steps including receiving a web content broadcast with the first marker inserted within the broadcast, combining the web content broadcast with a television broadcast and transmitting the combined broadcast.

14. The medium of claim 12 storing instructions executed to perform the steps including receiving broadcast content from a content provider, combining the broadcast content with television programming at a broadcast encoder and inserting a marker at the broadcast encoder.

15. The medium of claim 11 storing instructions executed to perform the steps including providing a second marker and associating said second marker with a second handle.

16. The medium of claim 12 storing instructions executed to perform the steps including calling a method which provides transmission details and terminates the handle.

17. The medium of claim 12 storing instructions executed to perform the steps including allowing said first and second markers to be accessed separately using separate handles so that transmission details associated with different portions of a transmission can be obtained.

18. The medium of claim 11 storing instructions executed to perform the steps including providing a log-in server, reporting a transmission to said log-in server and allowing a third party to access said log-in server to receive transmission reporting.

19. A non-transitory computer readable medium storing instructions executed by a computer to perform the steps of:

inserting a marker in an interactive television transmission;

providing an on-going count of bits transmitted from a point in time when the marker is transmitted; and upon request, reporting the on-going count of bits transmitted.

20. The medium of claim 19 storing instructions executed to perform the steps including providing an on-going count of time elapsed from the point in time when the first marker is transmitted.

21. The medium of claim 19 storing instructions executed to perform the steps including invoking a method which provides a handle to said marker.

22. The medium of claim 21 storing instructions executed to perform the steps including invoking a method which obtains current transmission details using said handle.

23. The medium of claim 22 storing instructions executed to perform the steps including providing a second marker and associating said second marker with a second handle.

24. The medium of claim 23 storing instructions executed to perform the steps including calling a method which provides transmission details and terminates the handle.

25. The medium of claim 23 storing instructions executed to perform the steps including allowing said first and second markers to be accessed separately using separate handles so that transmission details associated with different portions of a transmission can be obtained.

* * * * *